Feb. 21, 1928. 1,659,742
G. C. LEACH
FEEDER FOR SEED GRADERS
Filed Sept. 16, 1925    2 Sheets-Sheet 1

Inventor
Grover C. Leach

Feb. 21, 1928. 1,659,742
G. C. LEACH
FEEDER FOR SEED GRADERS
Filed Sept. 16, 1925 2 Sheets-Sheet 2

Inventor
Grover C. Leach.

Patented Feb. 21, 1928.

1,659,742

UNITED STATES PATENT OFFICE.

GROVER C. LEACH, OF BROWNWOOD, TEXAS.

FEEDER FOR SEED GRADERS.

Application filed September 16, 1925. Serial No. 56,762.

This invention relates to seed graders and has for its object the provision of a simple and inexpensive means whereby the seed will be prevented from clogging the outlet to the hopper and will be positively directed to the outlet. This object, and other objects which will incidentally appear in the course of the following description, are attained in such an apparatus as is illustrated in the accompanying drawings, and the invention resides in certain novel features which will be particularly pointed out in the appended claims.

Figure 2:
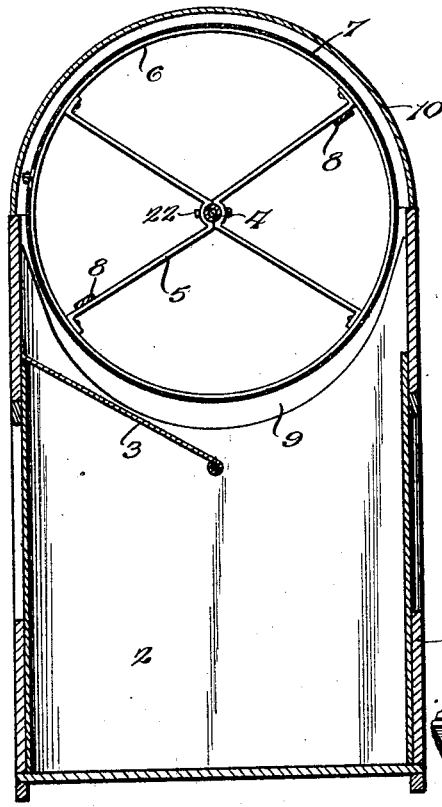
Figure 2 is a transverse vertical section through one of the bins and the grading cylinder.

The seed grader comprises a supporting frame 1 which may be of any preferred construction and dimensions and is equipped in its lower portion with a plurality of transverse partitions 2 whereby it is divided into a plurality of seed-receiving bins. In the upper portion of each bin is a deflector 3 which extends downwardly and inwardly from the front of the bin toward the center thereof so that the seed dropping from the grading cylinder will be directed toward the back of the bin and will be prevented from rolling out at the front of the bin when the front wall is removed to facilitate bagging of the seed. Rotatably mounted in the end walls of the frame or casing is a shaft 4 to which are secured a plurality of spiders 5, each of which carries a ring 6 supporting the grading cylinder, and the said cylinder consists of a series of axially alined cylindrical sections 7 of foraminous material, preferably wire netting, the mesh of the netting being progressively coarser from the receiving or hopper end of the cylinder to the opposite end thereof. Extending longitudinally of the cylinder and carried by the several spiders are bars or baffles 8 which are carried through the mass of seed as the cylinder is rotated so that the seed will be agitated and effectively treated by the several screens. At the end of the frame more remote from the hopper is a discharge opening 9 for the escape of trash, sticks, cotton burs, and other small objects, as well as faulty seed, and this opening may be conveniently provided by forming the upper edge of the end partition arcuate eccentric to the shaft 4 and the cylinder, as shown in Fig. 2.

Figure 4:
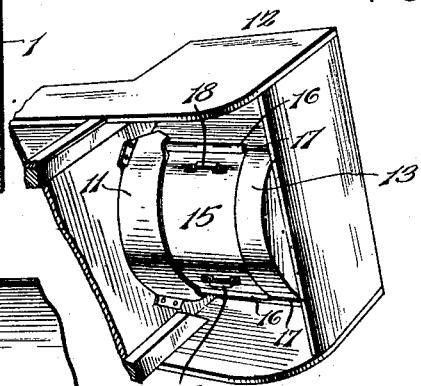
Figure 4 is a detail perspective view of the under side of the hopper showing the valve for controlling the outlet of the same.

The cylinder is preferably enclosed by a cover 10 which may be of sheet metal or otherwise formed as desired and rests at its ends upon the side walls and end wall of the main frame or casing 1, and at the receiving end of the cylinder or casing an opening is formed through the end wall of the casing and a chute or spout 11 is fitted through the same to project into the adjacent end of the cylinder and direct all of the seed into the latter. A hopper 12 is supported upon the end wall of the casing and is provided with an arcuate bottom 13 concentric with the shaft 4, a transverse opening 14 being formed in the said bottom immediately over the outer portion of the chute 11 so that the seed in the hopper may pass into the chute to be directed into the grading cylinder. A cut-off slide 15 is mounted on the bottom of the hopper and is supported by having beads 16 formed upon its side edges to engage around guide wires or rods 17 which are secured to the opposite end walls of the hopper, as will be understood upon reference to Fig. 4, and the slide is provided with suitable handles 18 whereby it may be manipulated. By referring to Fig. 1, it will be noted that the inner end of the slide fits between the bottom of the hopper and the outer end portion of the chute to be snugly received between said parts and, when properly set, extends across the slot 14 so as to entirely cut-off the flow or control the speed of the same in an obvious manner.

Figure 1:
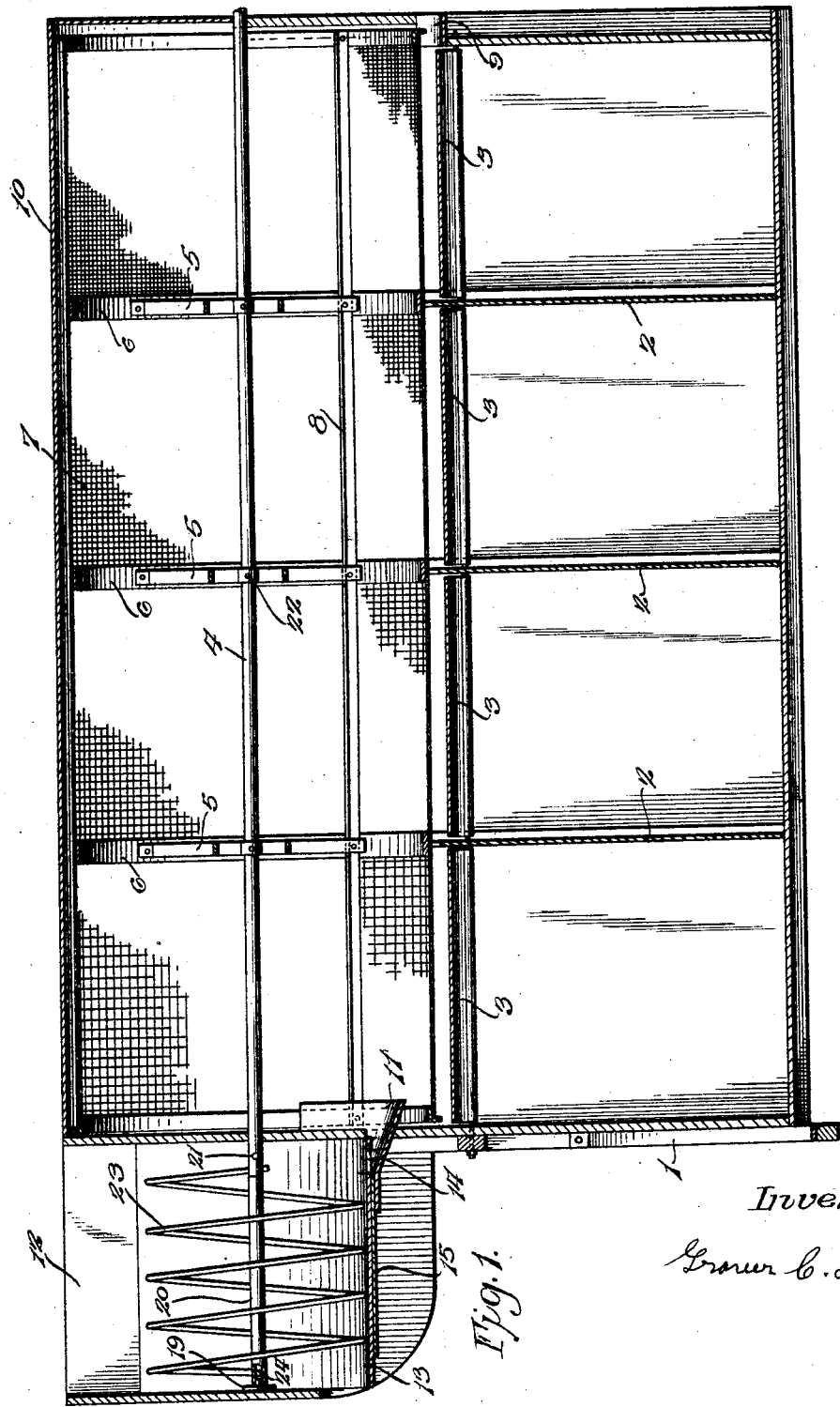
Figure 1 is a longitudinal vertical section of a seed grader embodying my present invention.
Figure 3:
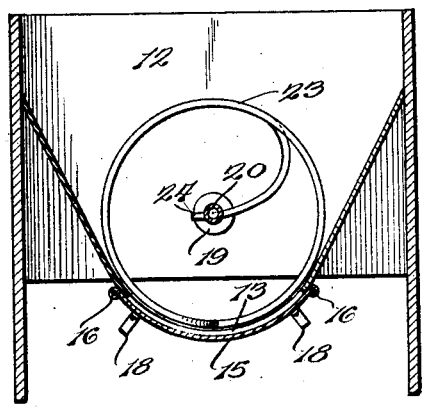
Figure 3 is a transverse vertical section through the hopper.
Figure 5:
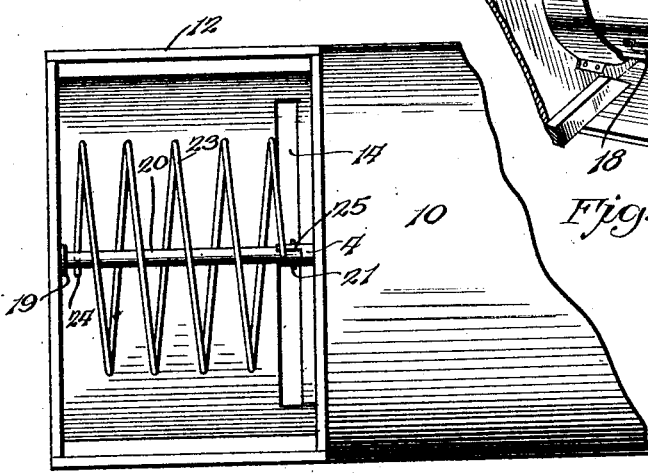
Figure 5 is a plan view of the hopper.

Upon the outer end wall of the hopper is secured a stud 19 alined axially with the shaft 4 and rotatably fitted upon the said stud is the outer end of a hollow shaft 20 which has its opposite end engaged in the adjacent socketed end of the shaft 4, as will be understood upon reference to Fig. 5. The shaft 20 is connected with the shaft 4 by a pin 21 inserted diametrically through the engaged ends of the two shafts and similar pins or bolts 22 are employed to connect the spiders 5 with the shaft 4. Within the hopper is provided a coiled spring 23 constituting an agitator and feeder whereby the seed will be prevented from clogging and will be positively fed to the outlet 14. This coiled spring is arranged concentric with the shaft 20 and one end 24 is bent or curved eccentrically so that it will be brought into position to pass through the end of the shaft 20, as shown in Figs. 1 and 3, so that it will be secured to the shaft and caused to rotate therewith. The opposite end of the spring is inserted through a longitudinally extending notch 25 in the end of the shaft 4 to pass diametrically through the adjacent end of the shaft 20, as shown in Fig. 5, so that both ends of the spring will be secured to the shaft 20 and caused to rotate therewith.

In the operation of the machine, power is applied to the far end of the shaft 4 in any convenient or preferred manner so that the grading cylinder and the agitator will be rotated in the proper direction. The seed is deposited in the hopper and will, of course, gravitate to the bottom of the same where it will be acted upon by the agitator spring 23, it being noted upon reference to Fig. 3 that the diameter of the coils is such that the lower portion of the spring is close to the bottom surface of the hopper to work over the same. The rotation of the shafts 4 and 20 will, of course, be transmitted to the grading cylinder and the agitator, and the agitator will work through the body of the seed in the hopper so as to keep the same loosened and prevent its clogging while at the same time it will drive the seed toward the outlet slot 14. The seed will be positively delivered in the end of the grading cylinder from the chute 11 and the rotation of the grading cylinder will agitate the seed to some extent so that those seeds which may pass through the foraminous wall of the cylinder may escape while the larger seed will be prevented from escaping and will be caused to pass into the next succeeding section of the cylinder. The baffle bars 8 will, of course, be carried around with the rotating cylinder and will be caused to move through the body of the seed and overcome all tendency of the mass to stagnate so that the seed in the cylinder will be very thoroughly agitated and permitted to escape according to size. The mass of seed will thus be automatically divided into grades, the several grades being received within the respective bins and automatically collected according to their commercial value. Any waste of seed, chaff or other matter which may remain in the cylinder at the far end of the same will escape through the outlet 9, as previously stated.

From the foregoing description, taken in connection with the accompanying drawings, it will be seen that I have provided a very simple and inexpensive means for preventing stagnation of the seed in the hopper and also positively feeding the seed to the grading cylinder.

Should there be any large foreign object in the seed which had been overlooked, the agitator will yield to the impact therewith so that breakage of the parts will be prevented and at the same time sufficient jar will be given the working parts to notify the operator of the presence of the obstruction so that it may then be removed.

Having thus described the invention, I claim:

1. The combination with a hopper provided with an outlet opening in its bottom immediately adjacent the end thereof, of a chute arranged below the hopper and the discharge opening therein and extending beyond the end of the hopper, and a transverse arcuate cut-off slidably mounted upon the bottom of the hopper and fitting snugly between the same and the chute to control the flow through the outlet opening.

2. A seed-cleaning and grading machine comprising a hopper having an arcuate bottom, and having a discharge opening in its bottom immediately adjacent the end of the same, a chute on the bottom of the hopper extending beyond the end thereof, longitudinal guides on the bottom of the hopper, and an arcuate cut-off provided at its side edges with beads slidably engaged around the guides, said cut-off fitting snugly between the bottom of the hopper and the chute to control flow through the discharge opening of the hopper.

In testimony whereof I affix my signature.

GROVER C. LEACH. [L. S.]

CERTIFICATE OF CORRECTION.

Patent No. 1,659,742.                                Granted February 21, 1928, to

GROVER C. LEACH.

It is hereby certified that error appears in the above numbered patent requiring correction as follows: In the drawings, sheet 1, Fig. 1, the finest mesh screen should appear at the left and the coarseness of the mesh increase in the successive sections toward the right. The slot 14 should extend to the right hand end of the hopper. What appears as an open space at the extreme left at the bottom of the hopper should be closed by a crescent-shaped metal plate having its lower edge turned under the bottom of the hopper a short distance and soldered thereto and its upper edge turned out to form a flange secured by nails or screws to the lower edge of the wooden end wall; and that the said Letters Patent should be read with this correction therein that the same may conform to the record of the case in the Patent Office.

Signed and sealed this 20th day of March, A. D. 1928.

M. J. Moore,
Sea l     .                                        Acting Commissioner of Patents.